Figure 1:
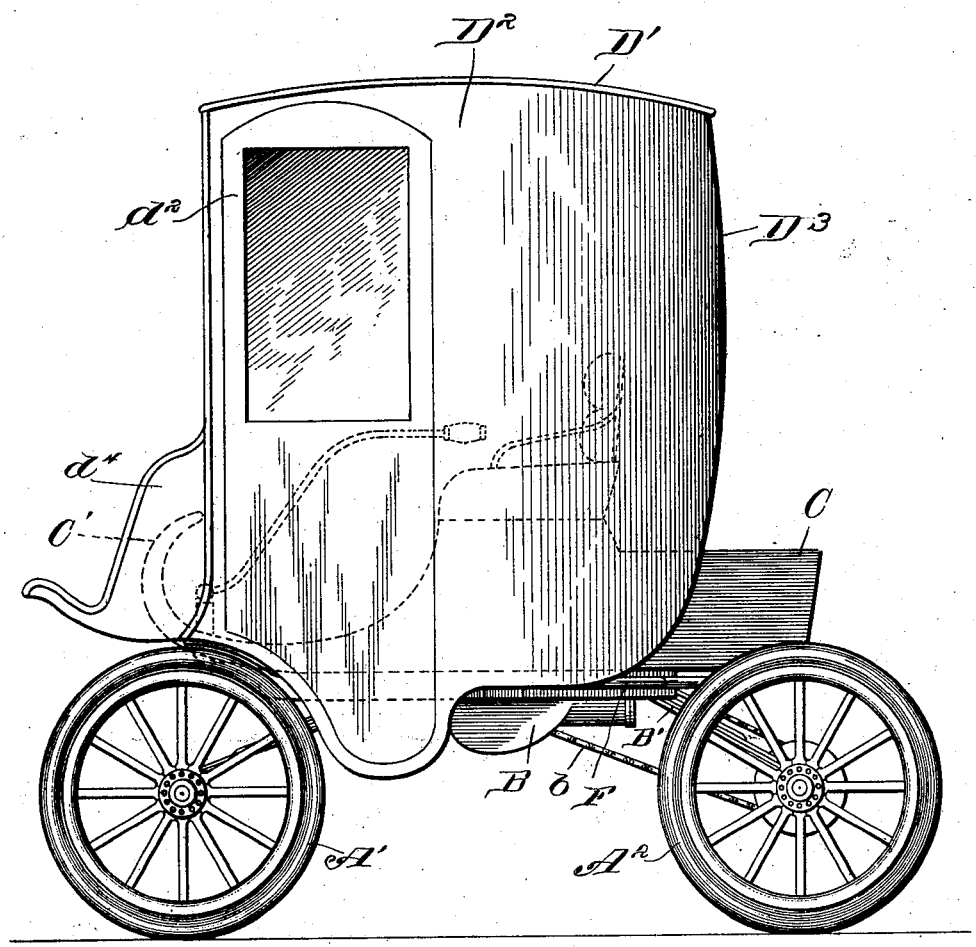

No. 747,937. PATENTED DEC. 29, 1903.
H. L. CALL.
VEHICLE.
APPLICATION FILED APR. 3, 1903.
NO MODEL. 3 SHEETS—SHEET 1.

Witnesses:
H. S. Gaither
C. C. Cunningham

Inventor:
Henry L. Call
by Chamberlin & Wilkinson
Attorneys.

No. 747,937. PATENTED DEC. 29, 1903.
H. L. CALL.
VEHICLE.
APPLICATION FILED APR. 3, 1903.
NO MODEL. 3 SHEETS—SHEET 2.
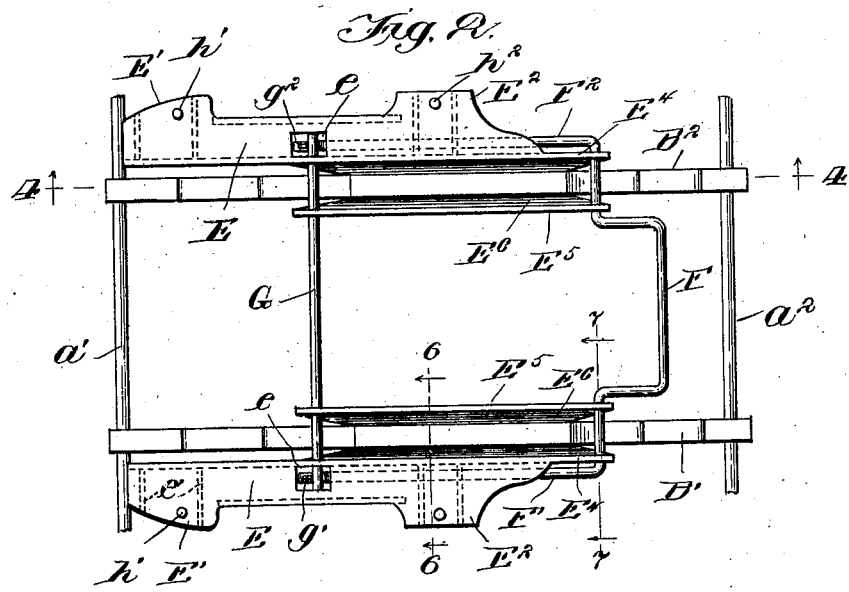
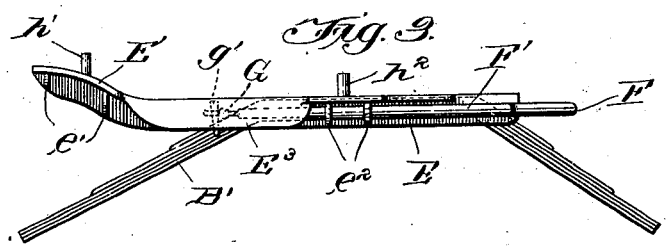
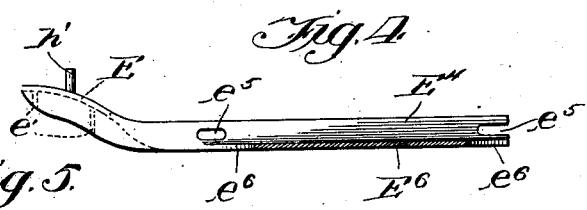
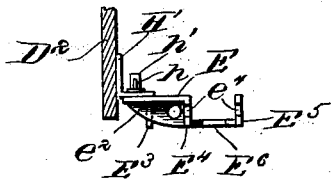
Witnesses:
H. S. Gaither
C. C. Cunningham
Inventor:
Henry L. Call
by Chamberlin & Wilkinson
Attorneys

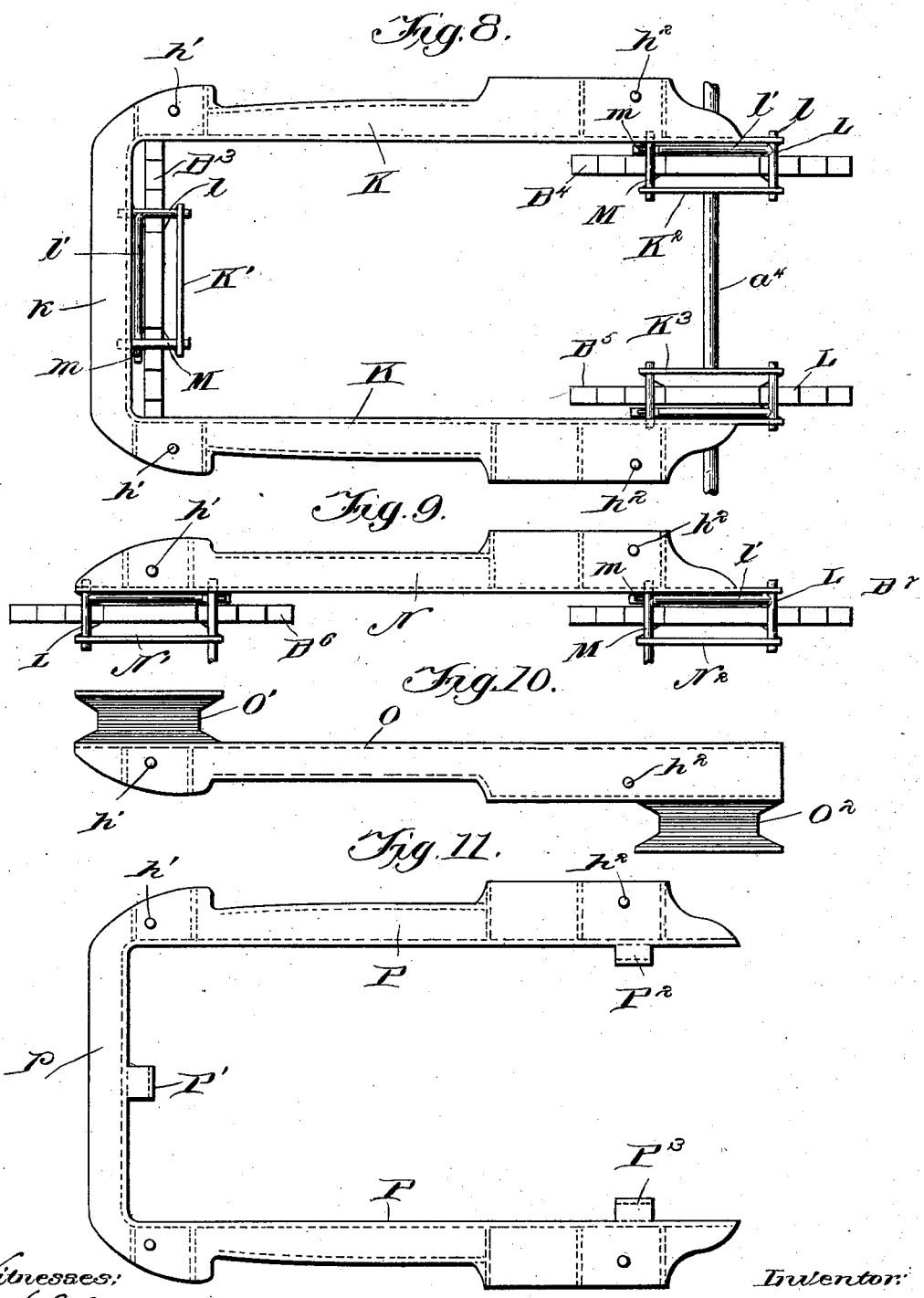

No. 747,937. Patented December 29, 1903.

UNITED STATES PATENT OFFICE.

HENRY L. CALL, OF CHICAGO, ILLINOIS.

VEHICLE.

SPECIFICATION forming part of Letters Patent No. 747,937, dated December 29, 1903.

Application filed April 3, 1903. Serial No. 150,871. (No model.)

*To all whom it may concern:*

Be it known that I, HENRY L. CALL, a citizen of the United States, residing at Chicago, county of Cook, State of Illinois, have invented a certain new and useful Improvement in Vehicles; and I declare the following to be a full, clear, and exact description of the invention, such as will enable others skilled in the art to which it pertains to make and use the same, reference being had to the accompanying drawings, which form a part of this specification.

My invention relates generally to vehicles, and more particularly to means for converting standard open vehicles into closed vehicles of conventional form.

The primary object of my invention is to render it possible to readily convert an open vehicle of any usual type—such, for instance, as a runabout—into a brougham or other type of closed vehicle, thereby adapting a single vehicle for use on occasions requiring either an open or closed vehicle, and consequently avoiding the necessity of and expense incident to the keeping of separate vehicles of open and closed types.

A further object of my invention is to provide a closed-vehicle top adapted to fit over an open-bodied vehicle and to be detachably supported, whereby an open vehicle of any usual type may be readily converted into a closed vehicle of conventional form.

A further object of my invention is to provide means for converting an open into a closed vehicle which will be simple in construction, comparatively inexpensive in manufacture, and efficient and durable in use.

My invention, generally described, consists in a rigid closed-vehicle top having an open bottom and means for detachably supporting the top above and around the body of a standard open vehicle, thereby rendering the vehicle convertible at will from an open to a closed vehicle, or vice versa.

My invention will be more fully described hereinafter with reference to the accompanying drawings, in which the same is illustrated in several convenient and practical forms, and in which—

Figure 1 is a side elevational view of an automobile runabout converted into a brougham; Fig. 2, a plan view of the means for detachably supporting a closed cover upon the side springs of the vehicle; Fig. 3, a side elevational view looking upwardly from the bottom of Fig. 2; Fig. 4, a sectional view on line 4 4, Fig. 2; Fig. 5, a fragmentary detail view showing the means for securing the vehicle-top to the supporting-frame; Figs. 6 and 7, views taken on lines 6 6 and 7 7, respectively, of Fig. 2; Fig. 8, a plan view of a modified form of support adapted for use on a vehicle having three springs; Fig. 9, another modification of the support adapted for use on vehicles having four springs; Fig. 10, still another modification of the support adapted for use upon vehicles having four springs, two of which are located nearer together than the others; and Fig. 11, a modified support for the detachable top adapted to be secured to the frame of the open vehicle.

Similar reference characters are used to indicate similar parts in the several figures of the drawings.

Referring more particularly to Figs. 1 and 2, A' and A² indicate front and rear pairs of wheels of a vehicle which are rotatably mounted upon the front and rear axles $a'$ and $a^2$.

B' and B² designate the side springs, which extend between the front and rear axles and are secured at their opposite ends thereto. The springs are shown as of a type used in motor-vehicles, in which the central portions of the springs are flat and located at a higher plane than the ends, which are united to the axles. The body C rests upon and is secured to the flat intermediate portions of the side springs.

B indicates a motor for propelling the vehicle, and $b$ a sprocket-chain for driving the rear axle from the motor. The motor forms no part of my invention, and hence need not be further described herein. Moreover, it is evident that my invention is capable of use in connection with the open vehicles which are drawn by horses, as well as those of horseless type.

The rigid closed top, which is detachably mounted above and around the open body C of the vehicle, is composed of a top D', a rear wall $D^3$, and side walls $D^2$. The side walls are preferably provided with hinged doors $d^2$ and with extensions $d^4$ of the side walls, which project slightly beyond the dashboard $C'$ of the open body C.

In order that the closed top may be detachably and at the same time securely supported upon the vehicle, I preferably provide a supporting-frame adapted to be removably secured to the vehicle upon which the closed top is detachably mounted. Such supporting-frame may conveniently be attached directly to the vehicle-springs, or it may be secured to the frame of the vehicle by suitable fastening devices.

In Fig. 2, E indicates a frame, preferably made of cast metal and comprising a horizontal top portion with laterally-projecting portions $E'$ and $E^2$, upon which are supported the side walls of the closed top. The frame E is provided with a channel, which surrounds the horizontal portion of one of the side springs. Such channel is formed by vertical flanges $E^4$ and $E^5$, the former of which depends below the horizontal surface upon which the closed top rests, and a horizontal bottom wall $E^6$ is interposed between and united to the lower edges of the flanges $E^4$ and $E^5$. The opposite ends of the bottom wall $E^6$ flare outwardly, so as to extend beyond the inclined portions of the spring at either side of the horizontal portion thereof. The flanges $E^5$ and $E^4$ are provided with open slots $e^4$ at the rear ends thereof and with elongated slots $e^5$ at the opposite ends thereof. Suitable transverse strengthening-webs $e'$ and $e^2$ are provided between the flange $E^4$ and the horizontal top portion of the frame for imparting strength thereto. A depending strengthening-flange $E^3$ is also provided.

Supporting-frames such as above described are located beneath the central portions of the two springs $B'$ and $B^2$ and are secured thereto by means of a transverse rod F, which extends above the corresponding inclined portions of the two springs adjacent to their juncture with the horizontal portions of the springs which support the vehicle-body. The horizontal rod F is provided with portions which engage the open slots $e^4$ in the pairs of flanges $E^4$ and $E^5$ in the respective supporting-frames. The opposite ends of the horizontal rod F are provided with forward extensions $F'$ and $F^2$, which pass through eyes formed in the ribs $e^2$ and terminate at points adjacent to the elongated slots $e^5$. A cross-rod G extends through the slots $e^5$ in the flanges $E^4$ and $E^5$ of each supporting-frame and is provided with slots at its opposite ends, through which extend the ends of the rods $F'$ and $F^2$. Suitable locking means— such, for instance, as wedges $g'$ and $g^2$—pass through slots in the ends of the rods $F'$ and $F^2$ and retain the latter in locked engagement with the cross-rod G. It is evident that the wedges serve to draw the cross-rods F and G toward each other, such relative movement being permitted by the open slots $e^4$ and the elongated slots $e^5$ and cause the cross-rods to tightly engage the inclined portions of the springs and through such engagement draw the channels in such supporting-frames closely around the intermediate portions of the springs. The frames are consequently securely attached to the springs, with their horizontal portions $E'$ and $E^2$ projecting laterally beyond the vertical body C into position to support the side walls of the closed top.

Any suitable fastening means may be employed for securing the lower edges of the side walls of the closed top to the flanges $E'$ and $E^2$ on the supporting-frames, such means being shown in Fig. 5 as consisting in an angle-bracket $H'$, located on the interior surface of the side wall $D^2$, near the bottom thereof, and projecting inwardly over the supporting-frame. Upwardly-projecting pins $h'$ and $h^2$ are preferably provided upon the portions $E'$ and $E^2$ of the supporting-frame, which extend through openings in the angle-brackets, such as $H'$. A locking-key $h$ extends above the horizontal portion of the bracket $H'$ through a slot in the pin $h'$, thereby securely fastening the vehicle-top to the supporting-frame.

In order that the locking-wedges $g'$ and $g^2$ may be inserted and removed from the ends of the rods $F'$ and $F^2$, openings $e$ are formed through the horizontal portions of the supporting-frames, as clearly shown in Fig. 2. The portions of the transverse rods F and G which lie above the springs are preferably flattened, as shown in Fig. 7, so as to closely engage and partially surround the springs and retain the channels in the frames in proper relation to the springs.

In Fig. 8 I have shown the supporting-frame as comprising not only the parallel side portions, but also an integral end portion uniting the same. K K indicate the side portions of the frame, and $k$ the integral end portion. The object of providing the end portion is to enable the frame to be secured to vehicles in which three springs are used, two supported transversely above the rear axle and the third in alinement with and above the front axle. Channels $K'$, $K^2$, and $K^3$ are provided upon the frame in proper positions to be located beneath the horizontal top portions of the respective springs, and as such channels are substantially the same in structure as the channels previously shown and described it is unnecessary to again describe them in detail. In lieu of the rods shown in Figs. 2 and 3 for locking the channels to the springs I may employ a locking device L, comprising a transverse portion $l$, adapted to lie above the spring $B^3$ and engage open slots in the ends of the side walls of the channel, united to a rod $l'$, the end of which extends through an opening in a short transverse rod M, which extends through elongated slots in the opposite ends of the walls of the channel and lies above the spring $B^3$. A locking-key $m$, preferably of wedge shape, extends through a slot in the end of the rod $l'$ and which projects beyond the rod M and retains the rods locked together and also securely fastens the channel to the spring $B^4$. Similar locking devices are provided for the channels $K^2$ and $K^3$, which underlie the springs $B^4$ and $B^5$ and support the frame at such points.

When the detachable top is to be used in connection with a vehicle the body of which is supported upon four springs, two above each axle, the frame is modified, as indicated in Fig. 9, in which N indicates a side frame provided with channels $N'$ and $N^2$, which underlie the corresponding springs $B^6$ and $B^7$ on the front and rear axles. Locking devices L, such as above described in connection with Fig. 8, are used to secure the channels in place about the springs, and thereby securely support the frame.

In some vehicles in which four springs are employed the pair on one axle, usually the front, is located nearer together than those on the rear axle, and consequently it is necessary that the frame should be provided with channels out of alinement with each other, as indicated in Fig. 10. In this figure O indicates the supporting-frame, and $O'$ and $O^2$ the channels carried thereby, to underlie the springs. The channels may be locked about the springs by any suitable means—such, for instance, as the locking device L.

It is of course to be understood that the frames shown in Figs. 9 and 10 are employed in duplicate, one being located at either side of the body of the vehicle and projecting laterally beyond the same, so as to afford a support for the side walls of the closed type.

With some structures of vehicles it is desirable that the closed type should not be supported by direct connection with the springs, but by connection with the framework of the vehicle, in which case any suitable number of brackets $P'$, $P^2$, and $P^3$ are carried by the frame P and are secured by suitable fastening devices to the framework of the vehicle. It is obvious that the brackets may be varied as to size and structure to correspond with the structure of the framework of the vehicle to which the supporting-frame for the closed top is to be attached.

Each of the modifications illustrated in Figs. 8 to 11, inclusive, possesses in common with the supporting-frame shown in Figs. 2 to 7, inclusive, the feature of being capable of ready attachment to an open-bodied vehicle and of having horizontal flanges projecting laterally beyond the sides of the vehicle and body to afford a support for the side walls of the closed top.

When it is desired to convert an open vehicle into a closed one, the supporting-frame is first secured to the vehicle either by means of the channels and coöperating locking devices, which engage the springs, or by other fastening means when the modified frame shown in Fig. 11 is used, after which the closed top is located above the open body of the vehicle with the side walls extending slightly below the floor of the vehicle-body and resting above the laterally-projecting portions of the supporting-frame. The supporting-frame, through the medium of the channels which extend under the top portions of the springs, is securely supported by the springs and at the same time readily detachable therefrom.

From the foregoing description it will be observed that I have invented a convenient and practical means for converting an open vehicle of a standard type into a closed vehicle of conventional form, and while I have illustrated the vehicle as of the runabout type which is converted into a brougham by securing thereto the closed top any form of an open vehicle may be transformed into any form of closed vehicle by varying the character of the top and the structure of the supporting means.

Having now fully described my invention, what I claim as new, and desire to secure by Letters Patent, is—

1. The combination with an open vehicle, of a rigid closed top having an open bottom and comprising top, rear, and side walls, and means for detachably supporting said closed top upon the vehicle with its walls surrounding the seat and floor of the body of the vehicle.

2. The combination with an open vehicle comprising running-gear, springs and an open body mounted thereon, of a closed top having an open bottom and comprising top, front, rear and side walls, means for detachably supporting said closed top upon the running-gear with its walls surrounding the seat and floor of the body of the vehicle.

3. The combination with an open vehicle, of a closed top adapted to be supported above the body of the vehicle, a frame for supporting the closed top, means for detachably securing said frame to the vehicle, and means for removably supporting the top upon said frame.

4. The combination with an open vehicle comprising running-gear, springs and an open body mounted thereon, of a closed top having an open bottom and comprising top, front, rear and side walls, a frame for supporting said closed top, means for detachably securing said frame to the springs of the vehicle, and means for removably supporting the side walls of said top upon said frame.

5. The combination with an open vehicle comprising a running-gear, springs and an open body mounted thereon, of a closed top having an open bottom and comprising top, front, rear and side walls, a frame for supporting said closed top located at a lower plane than the body of the vehicle and projecting laterally beyond the same, means for detachably securing said frame to the springs of the vehicle, and means for removably supporting the side walls of said closed top upon the laterally-projecting portions of said frame.

6. The combination with an open vehicle comprising running-gear, springs and an open body mounted thereon, of a closed top having an open bottom and comprising top, front, rear and side walls, a frame for supporting the closed top comprising portions extending beneath the vehicle-springs and integral portions extending laterally beyond the sides of the body of the vehicle, means engaging the vehicle-springs for securing said frame thereto, and means for removably securing the side walls of said closed top to the portions of said frame which project beyond the sides of the vehicle-body.

7. The combination with an open vehicle comprising running-gear, springs and an open body mounted thereon, of a closed top having an open bottom and comprising top, front, rear and side walls, a supporting-frame for said closed top comprising channels adapted to underlie and project above the vehicle-springs, detachable locking means engaging the walls of said channels and also engaging the upper surface of the vehicle-springs, and means for detachably securing said closed top to said frame.

8. The combination with an open vehicle comprising running-gear, springs and an open body mounted thereon, of a closed top having an open bottom and comprising top, front, rear and side walls, a supporting-frame for said closed top comprising channels adapted to underlie and extend beyond the vehicle-springs and integral laterally-projecting portions extending beyond the sides of the vehicle-body, detachable locking means securing the walls of said closed top to the laterally-projecting portions of said frame.

9. The combination with an open vehicle comprising running-gear, springs and an open body mounted thereon, of a detachable closed top adapted to surround the body of the vehicle, a supporting-frame for the closed top comprising channels adapted to extend beneath the central portions of the springs, side walls of said channels projecting beyond the juncture of the downwardly-inclined portions of the springs with the central portions thereof, rods extending above and across the inclined portions of the springs and engaging the side walls of said channels, means for drawing the rods at the ends of each channel toward each other, and thereby securely fastening said frame to the vehicle-springs, and means for detachably supporting the closed top upon said frame.

10. The combination with an open vehicle comprising running-gear, springs, and an open body mounted thereon, of a rigid closed top of conventional form comprising top, front, rear, and side walls and having an open bottom, and means for detachably supporting said top above and around the body of said open vehicle thereby making any usual type of open vehicle readily convertible into a closed vehicle of any conventional type.

11. The combination with an open vehicle, of a rigid closed brougham-top comprising top, front, rear, and side walls and having an open bottom, and means for detachably supporting said brougham-top upon and around the body of said open vehicle thereby making the same convertible at will into a closed vehicle of the brougham type.

12. The combination with an open motor-vehicle comprising running-gear, springs and an open body mounted thereon, of a rigid closed brougham-top having an open bottom and comprising top, front, rear and side walls and means for detachably supporting said closed brougham-top upon said open motor-vehicle with its walls inclosing the seat and floor of the body of the vehicle.

In testimony whereof I sign this specification in the presence of two witnesses.

HENRY L. CALL.

Witnesses:
GEO. L. WILKINSON,
C. C. CUNNINGHAM.